(12) United States Patent
Frisbie et al.

(10) Patent No.: US 10,533,288 B2
(45) Date of Patent: Jan. 14, 2020

(54) RAILROAD TRACK WIRE CONNECTION AND CORRESPONDING RAILROAD INSTALLATION

(71) Applicant: ALSTOM Transport Technologies, Saint-Ouen (FR)

(72) Inventors: James Frisbie, Melbourne, FL (US); Tony Spagnolia, Melbourne Beach, FL (US)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 79 days.

(21) Appl. No.: 15/883,657

(22) Filed: Jan. 30, 2018

(65) Prior Publication Data
US 2019/0234024 A1    Aug. 1, 2019

(51) Int. Cl.
| | |
|---|---|
| *E01B 11/00* | (2006.01) |
| *B61L 7/08* | (2006.01) |
| *E01B 29/32* | (2006.01) |
| *B61L 1/18* | (2006.01) |
| *B60M 5/00* | (2006.01) |

(52) U.S. Cl.
CPC ............ *E01B 11/00* (2013.01); *B60M 5/00* (2013.01); *B61L 1/181* (2013.01); *B61L 7/08* (2013.01); *E01B 29/32* (2013.01)

(58) Field of Classification Search
CPC ............ E01B 11/00; E01B 29/32; B61L 7/08
USPC .............................................. 238/14.05, 5, 6
See application file for complete search history.

(56) References Cited

U.S. PATENT DOCUMENTS

| | | | | |
|---|---|---|---|---|
| 5,004,190 A | * | 4/1991 | Montierth | E01B 7/24 104/279 |
| 5,224,575 A | * | 7/1993 | Plichta | B60M 1/305 191/22 R |
| 7,321,107 B2 | * | 1/2008 | Yagnik | C08K 3/22 219/540 |
| 7,530,502 B2 | * | 5/2009 | Sherriff | B61K 9/10 238/14.13 |
| 2008/0257973 A1 | * | 10/2008 | Reichle | E01B 26/005 238/351 |

(Continued)

*Primary Examiner* — Jason C Smith
(74) *Attorney, Agent, or Firm* — B. Aaron Schulman, Esq.; Stites & Harbison, PLLC

(57) ABSTRACT

The railroad track wire connection is configured for electrically connecting a first element of a railroad installation to a second element of the railroad installation, the first element and the second element being electrically conductive, at least one of the first element and the second element being a rail of a line of rails of a railroad track of the railroad installation. The railroad track wire connection comprises at least one first element wire having a proximal end for connection to the first element and a distal end, a first element connector provided at the distal end of each first element wire, the first element connector being configured for electrical connection with the second element directly or via a mating second element connector, wherein the first element connector comprises a magnetic element for generating a magnetic force with the second element for fixing the first element connector to the second element in a removable manner or with a magnetic element of the second element connector for fixing the first element connector to the second element connector in a removable manner.

21 Claims, 3 Drawing Sheets

(56) References Cited

U.S. PATENT DOCUMENTS

Figure 1:
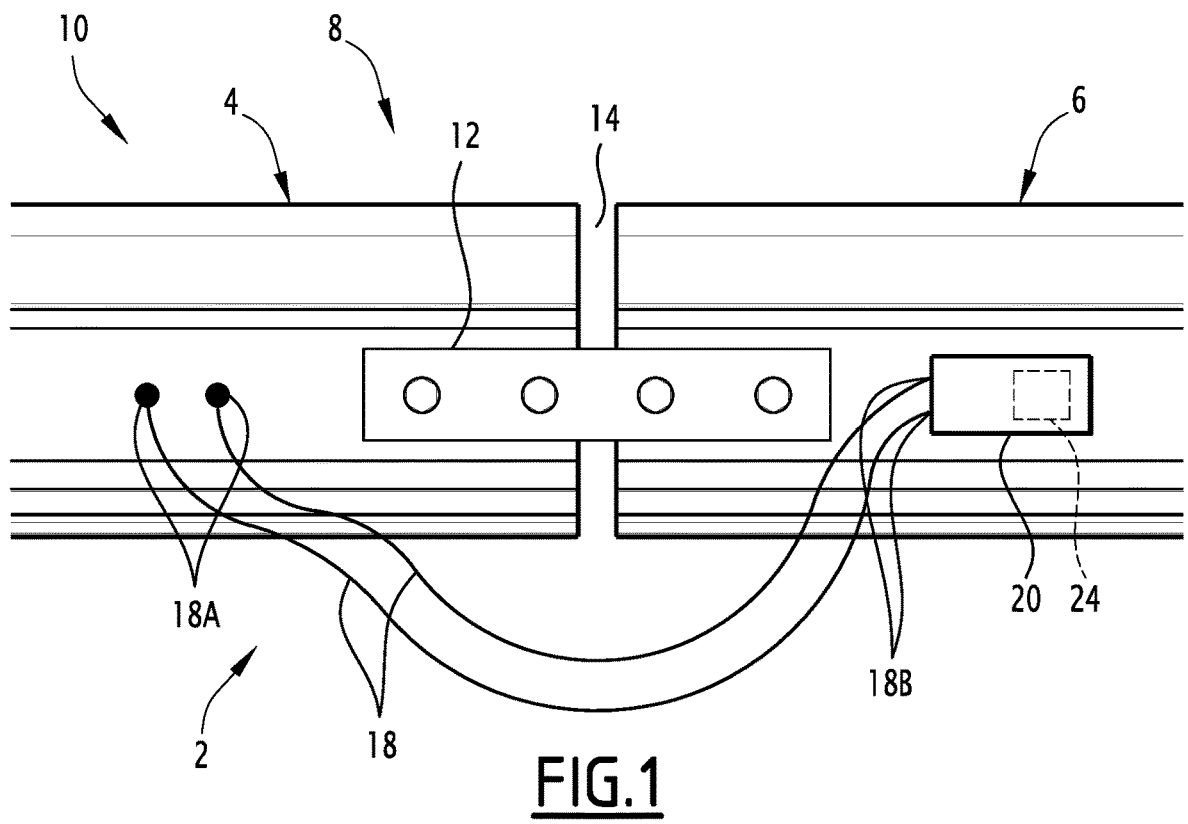

2010/0187322 A1\* 7/2010 Reichle .................... B60M 5/00
238/14.2
2010/0192334 A1\* 8/2010 Reichle .................... B60M 5/02
24/457
2010/0219256 A1\* 9/2010 Williams ................. B60M 5/00
238/14.05

\* cited by examiner

RAILROAD TRACK WIRE CONNECTION AND CORRESPONDING RAILROAD INSTALLATION

The present invention relates to track wire connections for electrically connecting two electrically conductive elements of a railroad installation, e.g. two successive rails of a line of rails of a railroad track of the railroad installation.

A railroad track generally comprises two parallel lines of rails, each line of rails being formed of succession of rails arranged in line and mechanically connected end-to-end at rail joints, e.g. using fishplates bolted to webs of the rails.

Signaling systems of railroad tracks may use the electrical conductivity of rails for generating and transmitting signals, e.g. signals indicative of the presence of a railway vehicle in a section of the railroad track.

Such information may be used to subdivide the railroad track in a plurality of railroad track sections and to prevent two distinct railway vehicles being present simultaneously on the same railroad track section, e.g. by stopping a railway vehicle before it enters into a railroad track section where another railway vehicle is already present.

An expansion space may be provided between the two adjacent ends of each pair of adjacent successive rails of a line of rails. Such expansion space is likely to interrupt electrical conductivity between the two successive rails.

In view of electrically connecting two successive rails of a line of rails, it is known to provide track wire connections, each track wire connection comprising a wire whose ends are connected to the two successive rails. Two track wire connections may be provided between the two rails of each pair of adjacent rails for sake of redundancy.

During maintenance operation performed on the railroad track, it may happen that a wire of a track wire connection may be damaged, and in particular sectioned. In particular, tamping machines are known for regularly damaging track wire connections.

If a wire of a track wire connection is damaged, the track wire connection has to be repaired before any commercial railway vehicle uses the railroad track for security reasons. The repair may be done by changing the damaged wire or splicing the two sections of a sectioned wire.

Repairing track wire connections is costly and time consuming. Besides, the railroad track cannot be operated as long as the damaged track wire connection(s) (is) are repaired, which inevitably has a financial impact.

One aim of the invention is to provide a railroad track wire connection that eases maintenance operations.

To this end, the invention proposes railroad track wire connection configured for electrically connecting a first element of a railroad installation to a second element of the railroad installation, the first element and the second element being electrically conductive, at least one of the first element and the second element being a rail of a line of rails of a railroad track of the railroad installation, the railroad track wire connection comprising at least one first element wire having a proximal end for connection to the first element and a distal end, a first element connector provided at the distal end of each first element wire, the first element connector being configured for electrical connection with the second element directly or via a mating second element connector, wherein the first element connector comprises a magnetic element for generating a magnetic force with the second element for fixing the first element connector to the second element in a removable manner or with a magnetic element of the second element connector for fixing the first element connector to the second element connector in a removable manner.

The first element connector provided for magnetic attachment to the second element or with a mating second element connector may be unintentionally disconnected from the second element or the second element connector, e.g. during railroad track maintenance operations, without damaging the first element connector and where the case may be the second element connector. The first railroad element connector can thus be reconnected to the second element or to the second element connector very simply and quickly, e.g. manually and without using a tool.

In other embodiments, the railroad track wire connection may comprise one or several of the following optional features, taken individually or in any technically feasible combination:

- the first element and the second element are respectively a first rail and a second rail mutually fixed end-to-end in a line of rails of a railroad track of the railroad installation;
- the first element is a rail of a line of rails of a railroad track of the railroad installation, and the second element is an electrical conductor housed in an electrical bungalow installed along the railroad track;
- the railroad track wire connection comprises a second element wire associated to each first element wire, each second element wire having a proximal end configured for secure fixing and electrical connection to the second element and a distal end connected to the second element connector;
- the first element wire and the associated second element wire have substantially the same length;
- one of the first element wire and the associated second element wire is strictly longer than the other;
- the second element connector is configured for being securely fixed to the second element;
- the magnetic element of the first element connector is a permanent magnet;
- the magnetic element of the first element connector is ferromagnetic, the railroad track wire connection comprising the second element connector having a magnetic element which is a permanent magnet;
- the first element connector is configured to generate with the second element or the second element connector a pull force comprised between 40 and 150 N.

The invention also relates to a railroad installation comprising at least one railroad track wire connection as defined above.

The invention and its advantages will be better understood upon reading the following description, which is given solely by way of non-limiting example and which is made with reference to the appended drawings, in which:

FIG. 1 is a diagrammatical view of a railroad track wire connection according to one example, the railroad track wire connection being provided between two rails at a rail joint of a railroad track; and FIG. 2-6 are diagrammatical views of railroad track wire connections according to other examples.

FIG. 1 illustrates a railroad track wire connection 2 electrically connecting an electrically conductive first element 4 and an electrically conductive second element 6 which are here two successive rails of a line of rails 8 of a railroad track 10 of a railroad installation 11.

The railroad track 10 may comprise two lines of rails 8 extending parallel to each other, the two lines of rails 8 being similar.

Each line of rails 8 comprises a plurality of rails which are arranged in a line, the rails being connected end-to-end, e.g. by fishplates. In a known manner, the rails of each line of rails 8 are secured to transverse members resting on a slab.

As illustrated on FIG. 1, the first element 4 and the second element 6 provided as successive rails are arranged successively in the line of rails 8 and are mechanically connected end-to-end, e.g. using fishplates 12, one fishplate 12 being visible on FIG. 1.

The first element 4 and the second element 6 are adjacent in the line of rails 8. The second element 6 is the next rail after the first element 4 in the line of rails 8.

Preferably, the first element 4 and the second element 6 are secured end-to-end with providing an expansion space 14 between the adjacent ends of the first element 4 and the second element 6. The expansion space 14 is provided for accommodating thermal expansion of the first element 4 and the second element 6.

The railroad track wire connection 2 ensures that the first element 4 and the second element 6 are electrically connected. An electrical current propagating in the first element 4 is transmitted to the second element 6 via the railroad track wire connection 2.

The railroad track wire connection 2 comprises at least one first element wire 18, each first element wire 18 having a proximal end 18A for securely fixing and electrical connection to the first element 4 and a distal end 18B, and a first element electrical connector 20 (hereinafter "first element connector 20"), the distal end 18B of each first element wire 18 being fixed and electrically connected to the first element connector 20.

The proximal end 18A of each first element wire 18 is configured for being fixedly secured and electrically connected to the first element 4.

The proximal end 18A is for example provided with a connection terminal, e.g. a lug or a ring terminal, for mechanical and electrical connection to the first element 4. Such connection terminal may be bolted to the first element 4.

As illustrated on FIG. 1, the railroad track wire connection 2 comprises two first element wires 18, each first element wire 18 having its proximal end 18A securely fixed and electrically connected to the first element 4 and its distal end 18B fixed and electrically connected to the first element connector 20.

The first element connector 20 may be configured for connecting to the second element 6 directly or via a mating second element electrical connector 22 (hereinafter "second element connector 22") of the railroad track wire connection 2, the second element connector 22 being configured for mating with the first element connector 20.

The first element connector 20 and the second element connector 22 are mating (or complementary) connectors ensuring electrical connection when they are plugged together.

As illustrated on FIG. 1, the first element connector 20 is configured for plugging to the second element 6 directly, with electrically connecting each first element wire 18 to the second element 6.

The first element connector 20 is configured for fixing or plugging to the second element 6 in a removable manner by magnetic attraction.

The first element connector 20 comprises a magnetic element 24 configured for generating an attraction magnetic force with the second element 4 for securing the first element connector 20 to the second element 4 in a removable manner.

The magnetic element 24 is for example a permanent magnet provided on the first element connector 20. Rails of railroad tracks are generally ferromagnetic whereby the permanent magnet 24 will generate an attraction magnetic force with the second element 6 which is a rail.

Figure 2:
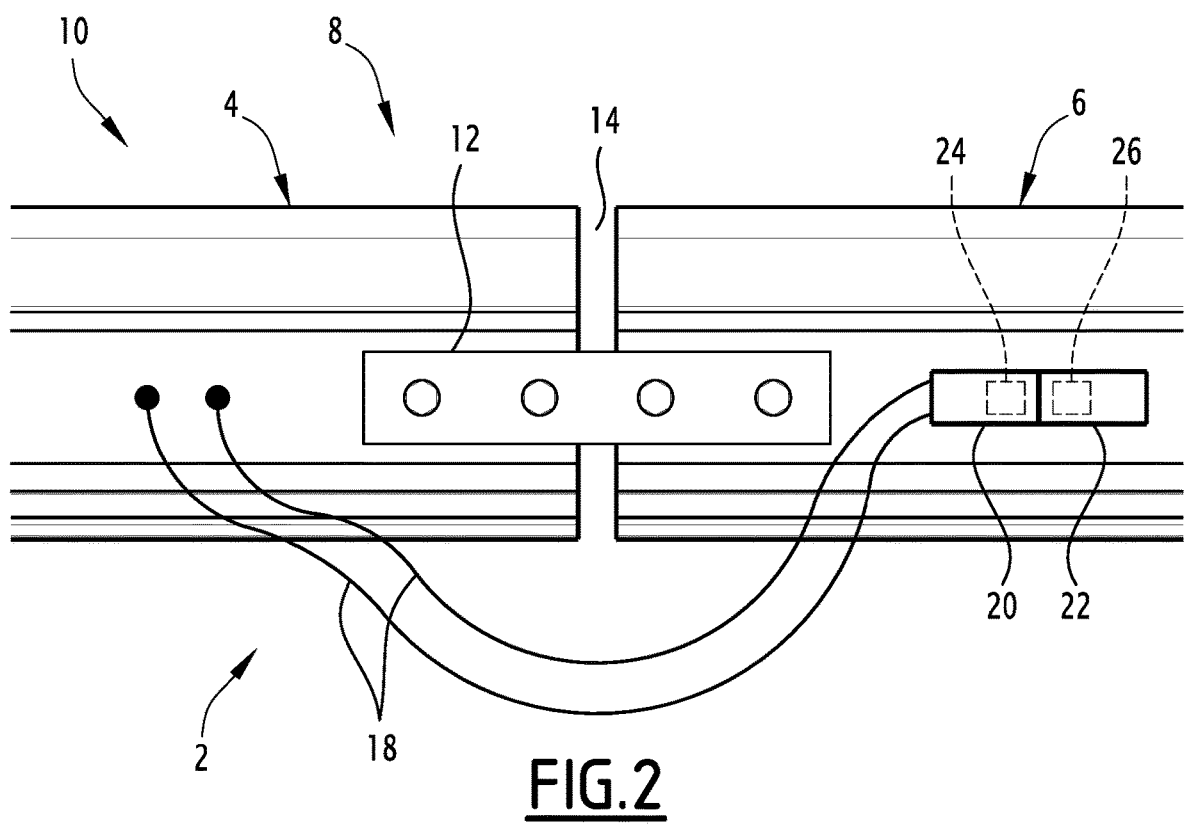

In the other example illustrated on FIG. 2, the first element connector 20 is configured for electrically connecting to the second element 4 via a second element connector 22 which is mating with the first element connector 20.

The first element connector 20 and the second element connector 22 are configured for plugging with each other.

The first element connector 20 and the second element connector 22 are configured for fixing to each other upon plugging in a removable manner by magnetic attraction.

The first element connector 20 and the second element connector 22 comprise respective magnetic elements 24, 26 configured for generating an attraction magnetic force between the first element connector 20 and the second element connector 22 for securing them to each other in a removable manner.

The magnetic element 24 of the first element connector 20 may be a permanent magnet, the magnetic element 26 of the second element connector 22 being a permanent magnet or a ferromagnetic element.

The magnetic element 24 of the first element connector 20 may be a ferromagnetic element or a magnetic element, the magnetic element 26 of the second element connector 22 being a permanent magnet.

As illustrated on FIG. 2, the second element connector 22 is fixedly secured to the second element 6 with establishing electrical connection with the second element 6. The second element connector 22 may be fixedly secured to the second element 6 for example via screw, rivet, bonding or welding.

Each first element wire 18 is electrically connected to the second element 6 when the first element connector 20 is plugged with the second element connector 22.

Figure 3:
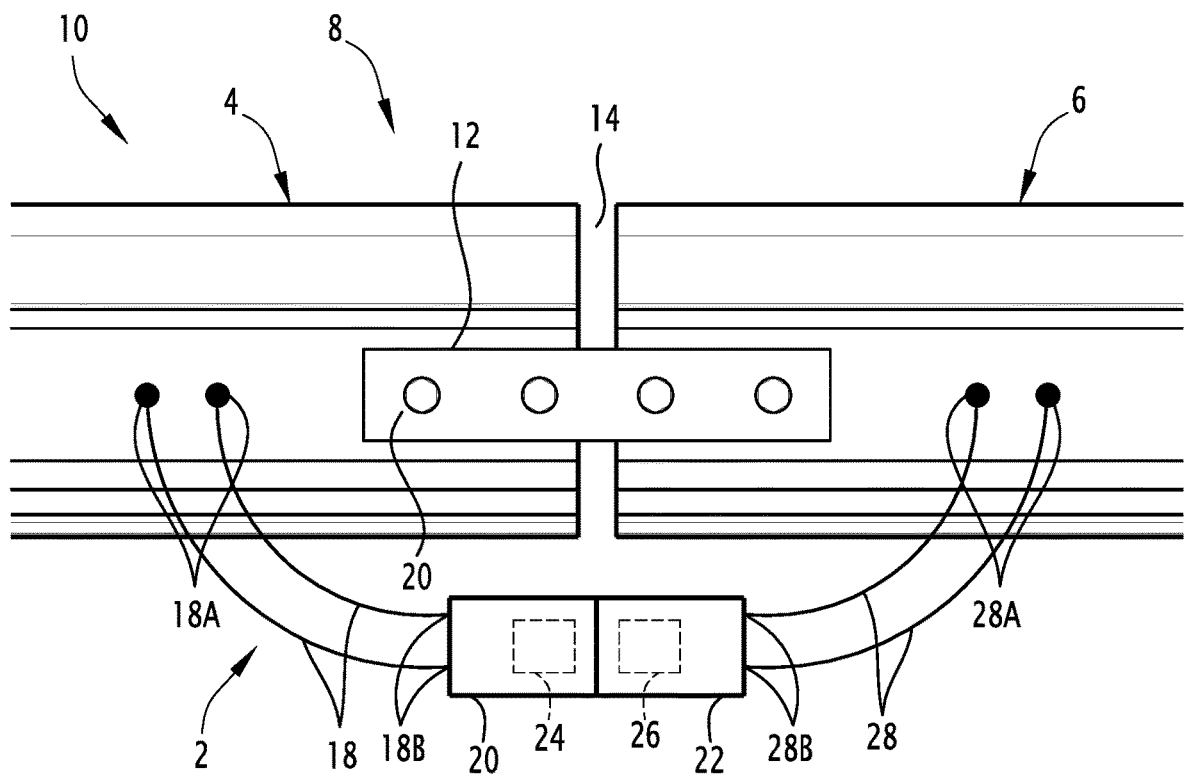

In the example illustrated on FIG. 3, the railroad track wire connection 2 comprises at least one second element wire 28, each second element wire 28 having a proximal end 28A configured for fixing and electrically connecting to the second element 6 and a distal end 28B fixed and electrically connected to the second element connector 22.

The proximal end 28A of each second element wire 28 is configured for securely fixing and electrical connection to the second element 6.

The proximal end 28A of each second element wire 28 is for example provided with a connection terminal, e.g. a lug or a ring terminal, for mechanical and electrical connection to the second element 6. Such connection terminal may be bolted to the second element 6.

Preferably, each first element wire 18 is associated to a respective second element wire 28, each first element wire 18 and the associated second element wire 28 being electrically connected one to the other when the first element connector 20 and the second element connector 22 are plugged together.

As illustrated on FIG. 3, the railroad track wire connection 2 comprises two first element wires 18 and two second element wires 28.

Figure 4:
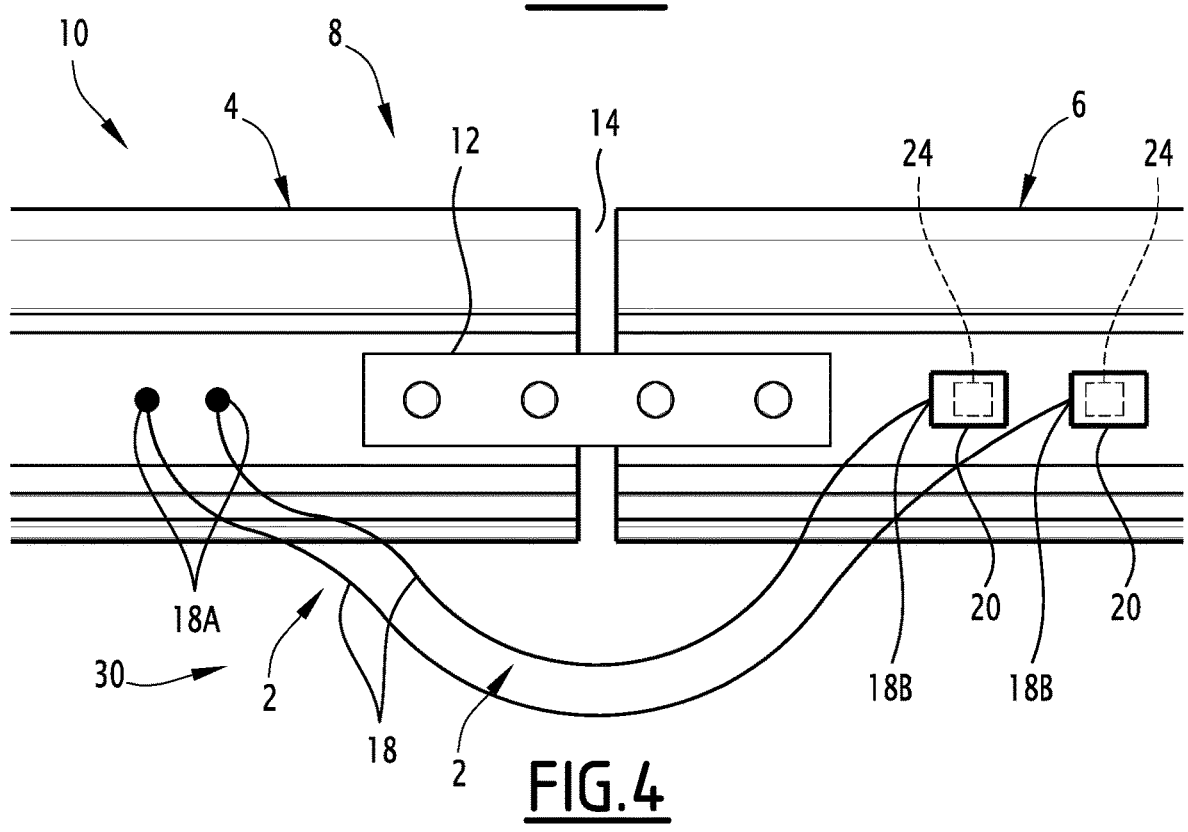
Figure 5:
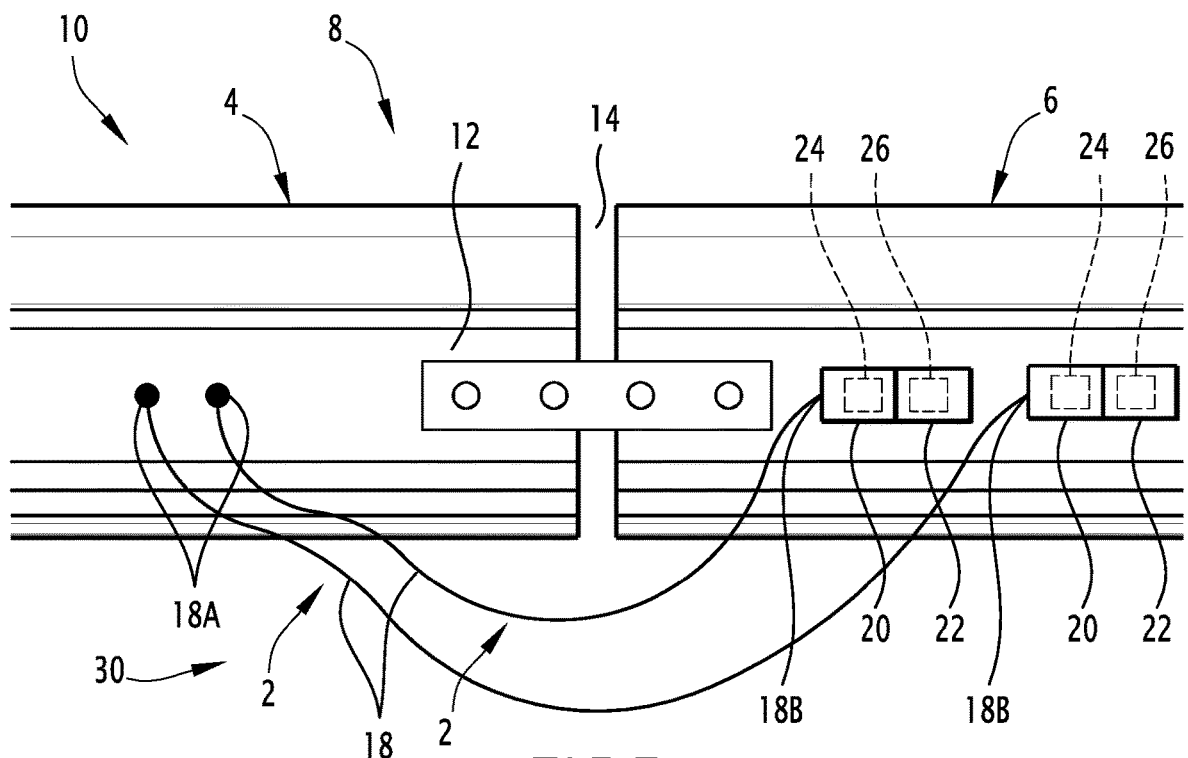
Figure 6:
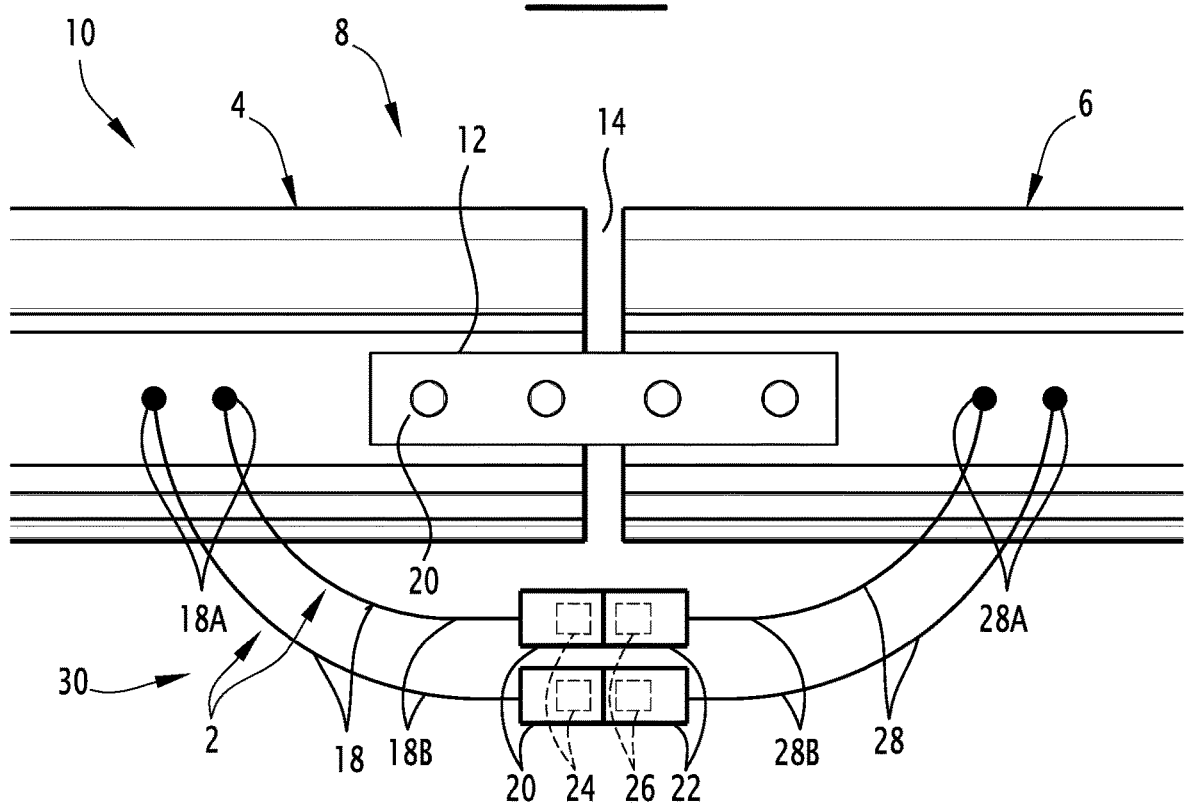

FIGS. 4-6 illustrate railroad track wire connection assemblies 30 electrically connecting the first element 4 and the second element 6, each of these railroad track wire connection assemblies 30 comprising two distinct railroad track wire connections 2 electrically connecting the first element 4 to the second element 6 in parallel.

As illustrated on FIG. 4, each railroad track wire connection 2 is similar to that of FIG. 1, except that each railroad track wire connection 2 comprises one single first element wire 18.

As illustrated on FIG. 5, each railroad track wire connection 2 is similar to that of FIG. 2, except that each railroad track wire connection 2 comprises one single first element wire 18 connecting to the second element 6 via a first element connector 20 arranged at the distal end 18A of the first element wire 18 and plugged to a second element connector 22 which is fixedly secured to the second element 6.

As illustrated on FIG. 6, each railroad track wire connection 2 is similar to that of FIG. 3, except that each railroad track wire connection 2 comprises one single first element wire 18 connecting to the second element 6 via a first element connector 20 arranged at the distal end 18A of the wire first rail wire 18 and connecting to a second element connector 22 provided at the distal end 28B of one single second element wire 28 having a proximal end 28A fixedly secured to the second element 6.

In alternative examples to that of FIG. 4-6, each railroad track wire connection 2 may comprise more than one single first element wire 18, e.g. two first element wire 18, and when the case may be, two second element wires 28.

In the railroad track wire connection assemblies 30 of FIG. 4-6, each railroad track wire connection 2 defines one single electrical connection between the first element 4 and the second element 6.

However, the distinct railroad track wire connections 2 provide distinct electrical connections between the first element 4 and the second element 6 for sake of redundancy.

The railroad track wire connection assemblies of FIG. 4-6 are advantageous over that of FIG. 1-3 in that one of the railroad track wire connection 2 may be accidentally unplugged whilst the other remain plugged, the first element 4 and the second element 6 being still electrically connected.

On the contrary, with a single railroad track wire connection 2 as illustrated one FIG. 1-3, the disconnection of the first element connector 20 from the second element 6 or the second element connector 22 suppresses the electrical connection between the first element 4 and the second element 6.

With the railroad track wire connections 2 illustrated on FIGS. 1-6, in operation, the first element 4 and the second element 6 are electrically connected by the railroad track wire connection 2.

The first element connector 20 is plugged directly on the second element 6 or to the second element connector 22, with being secured to the second element 6 or to the second element connector 22 by the attractive magnetic force generated between the second element 6 or the second element connector 22.

The first element connector 20 may be unintentionally unplugged from the second element 6 or the second element connector 22, e.g. during maintenance operation operated on the railroad track.

Unintentional unplugging may be effected for example by a machine processing the railroad track, e.g. a tamping machine processing the slab on which the line of rails 8 is placed.

Each railroad track wire connection 2 is configured such that the first element connector 20 will be unplugged from the second element 6 or the second element connector 22 by pulling before the first element wire 18 is damaged, and when the case may be before the second element wire 28 is damaged.

Therefore, the magnetic fixing between the first element connector 20 and the second element 6 or the second element connector 22 operates as a safety fixing which will separate before the first element wire 18 is damaged, and when the case may be before the second element wire 28 is damaged.

The first element connector 20 configured for magnetic fixing with the second element 6 or the second element connector 22 allows unplugging without damage to the railroad track wire connection, along with providing long lasting and sufficient force during normal operation.

Once the first element connector 20 has been unplugged from the second element 6 or the second element connector 22, the first element connector 20 can be easily re-plugged, e.g. manually by an operator, preferably without any tool.

Preferably, the first element connector 20 of the railroad track wire connection 2 is configured for being retained to the second element 6 or to the second element connector 22 solely by the attractive magnetic force generated by the magnetic element of the first element connector 20 in association with the second element 6 or the magnetic element of the second element connector 22.

The railroad track wire connection 2 is for example deprived of any additional mechanical fixing system for fixing the first element connector 20 to the second element 6 or to the second element connector 22, such as a screw, a screw/nut assembly, a rivet or a pin.

Optionally the first element connector 20 may comprises mechanical features configured for cooperating with complementary mechanical features of the second element 6 or the second element connector 22 for aligning or locating the first element connector 20 with respect to the second element 6 or the second element connector 22, e.g. for proper electrical connection of electrical contacts.

However, such mechanical features may not oppose unplugging of the first element connector 20 from the second element 6 or the second element connector 22, in particular by pulling.

In a magnetic fixing between two magnetic elements, the pull force is the force that has to be applied by pulling on the two magnetic elements to separate them from each other.

The railroad traction wire connection 2 is configured such that the pull force between the first element connector 20 and the second element 6 or the second element connector 22 is comprised between 40 and 150 N.

Such a pull force allows a reliable fixing between the first element connector 20 and the second element 6 or the second element connector 22, whilst allowing unplugging of the first element connector 20 without damage to the railroad traction wire connection 2.

The invention is not limited to the railroad track wire connection and railroad track wire connection assemblies illustrated on FIGS. 1-6.

In the embodiments of FIGS. 3 and 6, the first element wire and the associated second element wire of the railroad track wire connection have substantially the same length.

Alternatively, one of the first element wire and the associated second element wire is strictly longer than the other.

Besides, other combinations of railroad track wire connections may be proposed.

For example a railroad track wire connection assembly may comprise two railroad track wire connections with opposed configuration, for example a railroad track wire connection comprising a first element wire having a proximal end fixedly secured and electrically connected to the first element and a distal end provided with a first element wire connector for plugging to the second element directly or via a second element connector, which is e.g. fixedly secured to the second element or electrically connected to the first element via a second element wire, and another railroad track wire connection comprising a second element wire having a proximal end fixedly secured and electrically connected to the second element and a distal end provide with a second element wire connector for plugging to the first element directly or via a first element connector which is e.g. fixedly secured to the second element.

In the examples illustrated and explained above, the first element and the second element are two successive rails of a line of rails of the railroad track, i.e. a rail and the next rail of the line of rails.

In this application, the railroad track wire connection is configured for electrically connecting a first rail and a second rail which are successive rails of a line of rails of a railroad track, the railroad track wire connection comprising at least one first rail wire having a proximal end for connection to the first rail and a distal end, a first rail connector provided at the distal end of each first rail wire, the first rail connector being configured for electrical connection with the second rail directly or via a mating second rail connector, wherein the first rail connector comprises a magnetic element for generating a magnetic force with the second rail for fixing the first rail connector to the second rail in a removable manner or with a magnetic element of the second rail connector for fixing the first rail connector to the second rail connector in a removable manner.

In other applications, the railroad track wire connection may be used for connecting a rail to another electrically conductive element of the railroad installation, said second element not being a rail, but for example an electrical conductor housed in a railroad bungalow located along or beneath the railroad track, in particular an electrical conductor of a signaling system of the railroad installation.

In such application, the first element may be a rail, the second element not being a rail (e.g. an electrical conductor of a bungalow of the railroad installation) or the first element may not be a rail (e.g. an electrical conductor of a bungalow of the railroad installation), the second element being a rail.

In the examples described above, when the first element connector provided with a magnetic element is configured for plugging directly on the second element (without the interposition of a second element connector), the second element is preferably ferromagnetic such that the magnetic element of the first element connector will generated an attraction magnetic force directly with the second element.

The invention claimed is:

1. Railroad track wire connection configured for electrically connecting a first element of a railroad installation to a second element of the railroad installation, the first element and the second element being electrically conductive, at least one of the first element and the second element being a rail of a line of rails of a railroad track of the railroad installation, the railroad track wire connection comprising at least one first element wire having a proximal end for connection to the first element and a distal end, a first element connector provided at the distal end of each first element wire, the first element connector being configured for electrical connection with the second element directly or via a mating second element connector, wherein the first element connector comprises a magnetic element for generating a magnetic force with the second element for fixing the first element connector to the second element in a removable manner or with a magnetic element of the second element connector for fixing the first element connector to the second element connector in a removable manner, wherein the first element is a rail of a line of rails of a railroad track of the railroad installation, and the second element is an electrical conductor housed in an electrical bungalow installed along the railroad track.

2. Railroad track wire connection according to claim 1, wherein the first element and the second element are respectively a first rail and a second rail mutually fixed end-to-end in a line of rails of a railroad track of the railroad installation.

3. Railroad track wire connection according to claim 1, comprising a second element wire associated to each first element wire, each second element wire having a proximal end configured for secure fixing and electrical connection to the second element and a distal end connected to the second element connector.

4. Railroad track wire connection according to claim 3, wherein the first element wire and the associated second element wire have substantially the same length.

5. Railroad track wire connection according to claim 3, wherein one of the first element wire and the associated second element wire is strictly longer than the other.

6. Railroad track wire connection according to claim 1, wherein the second element connector is configured for being securely fixed to the second element.

7. Railroad track wire connection according to claim 1, wherein the magnetic element of the first element connector is a permanent magnet.

8. Railroad track wire connection according to claim 1, wherein the magnetic element of the first element connector is ferromagnetic, the railroad track wire connection comprising the second element connector having a magnetic element which is a permanent magnet.

9. Railroad track wire connection according to claim 1, wherein the first element connector is configured to generate with the second element or the second element connector a pull force comprised between 40 and 150 N.

10. Railroad installation comprising at least one railroad track wire connection according to claim 1.

11. Railroad track wire connection configured for electrically connecting a first element of a railroad installation to a second element of the railroad installation, the first element and the second element being electrically conductive, at least one of the first element and the second element being a rail of a line of rails of a railroad track of the railroad installation, the railroad track wire connection comprising at least one first element wire having a proximal end for connection to the first element and a distal end, a first element connector provided at the distal end of each first element wire, the first element connector being configured for electrical connection with the second element via a mating second element connector securely attached to the second element, wherein the first element connector comprises a magnetic element for generating a magnetic force with a magnetic element of the second element connector for fixing the first element connector to the second element connector in a removable manner.

12. Railroad track wire connection according to claim 11, wherein the first element and the second element are respectively a first rail and a second rail mutually fixed end-to-end in a line of rails of a railroad track of the railroad installation.

13. Railroad track wire connection according to claim 1 wherein the first element is a rail of a line of rails of a railroad track of the railroad installation, and the second element is an electrical conductor housed in an electrical bungalow installed along the railroad track.

14. Railroad track wire connection according to claim 1, comprising a second element wire associated to each first element wire, each second element wire having a proximal end configured for secure fixing and electrical connection to the second element and a distal end connected to the second element connector.

15. Railroad track wire connection according to claim 3, wherein the first element wire and the associated second element wire have substantially the same length.

16. Railroad track wire connection according to claim 3, wherein one of the first element wire and the associated second element wire is strictly longer than the other.

17. Railroad track wire connection according to claim 1, wherein the magnetic element of the first element connector is a permanent magnet.

18. Railroad track wire connection according to claim 1, wherein the magnetic element of the first element connector is ferromagnetic, the railroad track wire connection comprising the second element connector having a magnetic element which is a permanent magnet.

19. Railroad track wire connection according to claim 1, wherein the first element connector is configured to generate with the second element or the second element connector a pull force comprised between 40 and 150 N.

20. Railroad installation comprising at least one railroad track wire connection according to claim 1.

21. Railroad track wire connection configured for electrically connecting a first element of a railroad installation to a second element of the railroad installation, the first element and the second element being electrically conductive, at least one of the first element and the second element being a rail of a line of rails of a railroad track of the railroad installation, the railroad track wire connection comprising at least one first element wire having a proximal end for connection to the first element and a distal end, a first element connector provided at the distal end of each first element wire, the first element connector being configured for electrical connection with the second element directly or via a mating second element connector, wherein the first element connector comprises a magnetic element for generating a magnetic force with the second element for fixing the first element connector to the second element in a removable manner or with a magnetic element of the second element connector for fixing the first element connector to the second element connector in a removable manner, wherein the railroad track wire connection further comprises a second element wire associated to each first element wire, each second element wire having a proximal end configured for secure fixing and electrical connection to the second element and a distal end connected to the second element connector.

* * * * *